US006816899B1

(12) United States Patent
Meah

(10) Patent No.: US 6,816,899 B1
(45) Date of Patent: Nov. 9, 2004

(54) COMMUNICATIONS SYSTEM

(75) Inventor: Fokru Meah, Maidenhead (GB)

(73) Assignee: Marconi UK Intellectual Property Ltd., Coventry (GB)

( * ) Notice: Subject to any disclaimer, the term of this patent is extended or adjusted under 35 U.S.C. 154(b) by 0 days.

(21) Appl. No.: 09/518,394

(22) Filed: Mar. 3, 2000

(30) Foreign Application Priority Data

Mar. 9, 1999 (GB) .............................................. 9905252

(51) Int. Cl.$^7$ .............................................. G06F 15/16
(52) U.S. Cl. .................... 709/225; 709/241; 709/217; 709/232; 370/252; 370/389; 380/279; 713/201
(58) Field of Search ................................ 709/203, 241, 709/217, 232, 228, 226, 225; 713/201; 380/279; 370/252, 389

(56) References Cited

U.S. PATENT DOCUMENTS

| 5,459,837 | A | | 10/1995 | Caccavale | |
|---|---|---|---|---|---|
| 5,563,941 | A | * | 10/1996 | Stademann | ............ 379/266.01 |
| 5,754,787 | A | * | 5/1998 | Dedrick | ....................... 709/228 |
| 5,796,934 | A | | 8/1998 | Bhanot et al. | |
| 6,003,136 | A | * | 12/1999 | Schanze | ...................... 713/201 |
| 6,021,443 | A | * | 2/2000 | Bracho et al. | .............. 709/241 |
| 6,047,327 | A | * | 4/2000 | Tso et al. | ..................... 709/232 |
| 6,182,139 | B1 | * | 1/2001 | Brendel | ....................... 709/226 |
| 6,205,479 | B1 | * | 3/2001 | Dulai et al. | .................. 709/225 |
| 6,442,598 | B1 | * | 8/2002 | Wright et al. | ................ 709/217 |
| 6,456,597 | B1 | * | 9/2002 | Bare | ........................... 370/252 |
| 6,496,580 | B1 | * | 12/2002 | Chack | .................... 379/266.01 |
| 6,570,849 | B1 | * | 5/2003 | Skemer et al. | ........... 370/230.1 |
| 6,594,765 | B2 | * | 7/2003 | Sherman et al. | ............. 713/202 |

FOREIGN PATENT DOCUMENTS

| CA | 2245463 | 3/1999 |
|---|---|---|
| JP | 7056838 | 3/1995 |
| WO | WO 96/30841 | 10/1986 |
| WO | WO 98/27753 | 6/1998 |

OTHER PUBLICATIONS

Kanakia et al., "The VMP Network Adapter Board (NAB): High–Performance Network Communication for Multiprocessors", 1998 ACM 0–89791–279, pp. 175–187.*
Yen et al., "On Efficiently Tolerating General Failures in Autonomous Decentralized Multiserver Systems"., 1995, IEEE 0–8186–7087, pp. 288–296.*
Ravindran., "Application–specific Group Communications in Distributed Servers", 1991, IEEE 0–87942–694–2, pp. 3vol. xx+1515.*
Kanakia et al., "The VMP Network Adapter Board (NAB): High–Performance Network Communication for Multiprocessors", 1998 ACM 0–89791–279, pp. 175–187.*
Yen et al., "On Efficiently Tolerating General Failures in Autonomous Decentralized Multiserver Systems"., 1995, IEEE 0–8186–7087, pp. 288–296.*
Ravindran., "Application–specific Group Communications in Distributed Servers", 1991, IEEE 0–87942–694–2, pp. 3vol. xx+1515.*

* cited by examiner

Primary Examiner—Marc D. Thompson
Assistant Examiner—Thanh T. Nguyen
(74) Attorney, Agent, or Firm—Kirschstein, et al.

(57) ABSTRACT

A communications system comprising one or more servers and one or more clients. The servers are connected to the clients, for the provision of information to the clients. Each server is operative for sending control messages to the clients at or above a set rate. Each client is operative for detecting the control messages, and for determining a fault condition if the control messages are not received from each one of the servers at less than predetermined time intervals.

19 Claims, 1 Drawing Sheet

COMMUNICATIONS SYSTEM

BACKGROUND OF THE INVENTION

The present invention relates to the field of communications and in particular communications systems wherein one or more clients are connected to one or more servers and ways of detecting failures occurring therein.

Clients and servers exist in many different kinds of communications systems including intelligent networks which play an increasingly important role in modern telecommunications networks. In intelligent networks servers, known as service data points (SDP), provide service data to the intelligent network separate from service control functions provided by clients, known as service control points (SCP). Instead of storing data locally, SCP clients have to contact remote SDP servers for all data functions. Since the SDP is separate from the SCP, the SCP requires a reliable and rapid method of detecting system failures affecting its ability to contact and retrieve data from SDPs. These failures include failure of communications links between the SCP and an associated SDP and partial or total failure of an SDP.

Acknowledgement based systems currently in use depend on window-based flow (or congestion) control. The window method of flow control works by a client limiting the number of packets it will send to a particular server before receiving a response from that server. If the limit is set at "n" packets, and if "n" packets have been sent with no response, then the client will not send another packet until a response is received to one of the packets already sent. Further packets will then be sent as further responses are received. However if a failure has occurred, either in the destination server or in the route used to access it, all the packets sent in the window will be lost.

The client may also set a timer to a certain time period during which a response is expected. If no response is received before the expiry of the time period, an error is detected. However communication speed is such that a large number of other packets may be sent before the time period associated with the first packet has expired. These other packets could therefore be lost in addition to the original packet by being sent along a faulty route or to a faulty server before the fault had been detected.

The timer method described above can only detect a single failure (i.e. in a single route or SDP interface) at a time. Normally, each SDP has two interfaces to each SCP. If an SDP fails, both interfaces would have to be tried in turn before the SCP will know that it is the SDP that has failed and not merely one of the routes to it. As a result, an increased number of packets could be lost before the failure of the SDP is detected by the SCP. If a pair of SDPs fail at about the same time then four interfaces would have to be tried by a SCP before it will be possible to identify the extent of the fault. As a result of the accumulated delay in identifying such multiple faults the number of packets that could be lost rises even further. There is therefore a need for a way of rapidly detecting such failures.

SUMMARY OF THE INVENTION

The present invention provides a communications system comprising one or more servers and one or more clients; the servers for connection to the clients, for the provision of information to the clients; each server comprising means for sending control messages to the clients at or above a set rate; each client comprising means for detecting the control messages and monitor means for determining a fault condition if the control messages are not received from each one of the servers at less than predetermined time intervals.

BRIEF DESCRIPTION OF THE DRAWINGS

An embodiment of the present invention will now be described by way of example and with reference to the FIGURE which shows in block diagrammatic form a client-server network.

DETAILED DESCRIPTION OF THE PREFERRED EMBODIMENT

Figure 1:
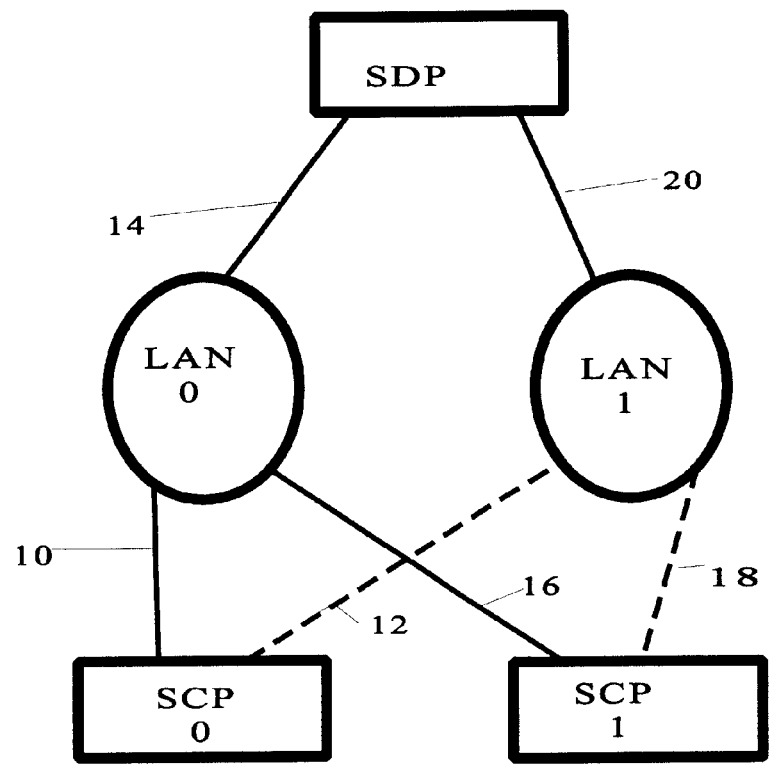

The FIGURE shows an embodiment of the present invention as applied to intelligent networks (IN). The network of the FIGURE comprises a server (IN service data point) SDP connected to two clients (IN service control points) SCP0 and SCP1 via two broadcast local area networks (LAN0, LAN1). On a broadcast network (e.g., LAN) if one can verify communication in one direction then it is safe to assume that bidirectional communication is also available. Each client and server (SDP, SCP0, SCP1) has an interface to a physical connection 10, 12, 14, 16, 18, 20 to each of the networks LAN0, LAN1 between them. Each interface on each client and server to each physical connection 10, 12, 14, 16, 18, 20 has a unique internet protocol (IP) address. The server is arranged to send (when operating correctly) control messages at regular intervals to each client with which it may be connected. The time interval between messages can be very small, e.g., in the range from a few milliseconds to a few tens of milliseconds. In the embodiment of the FIGURE, the server SDP has a plurality of routes available to each client SCP0, SCP1. For example server SDP may communicate with client SCP0 via physical connection 14, network LAN0 and physical connection 10. Alternatively the server SDP may communicate with the same client SCP0 via physical connection 20, network LAN1 and physical connection 12.

Each client checks for the receipt of valid control messages from each server with which it may be connected and that each valid control message is received within a predetermined time period or interval of the immediately previous one from the same server. According to a preferred embodiment, the client will check for receipt of valid control messages via each available route from each server with which it may be connected. To do this each client is provided with a number of so-called watchdog processes each of the watchdog processes for checking that control messages are received from a particular interface on a particular server. In its simplest form the watchdog process comprises a re-settable timer which is arranged to be reset every time a valid control message is received from the appropriate server interface. If no correct control messages are received, the watchdog timer will continue to count until it reaches a predetermined value or timeout at which the client deems a failure to have occurred. If no message is received from a particular server interface after a certain time (i.e. after expiry of the relevant timeout as determined by the watchdog process) that server interface is considered unusable. If it is the server that has failed then the flow of control messages from that server via all available interfaces will cease. In the arrangement of the present invention clients will automatically detect the lack of control messages via all available interfaces from a failed server without the need to poll alternative routes in turn. Advantageously the duration of the time out may be set to a value corresponding to a time period during which, in normal operation, more than one control message would be received. Hence the watchdog process may be made tolerant of transient faults which result in the loss of the odd control message but do not seriously affect the operation of the network.

As soon as a predetermined number of control messages with no error is received from a server interface previously marked as unusable it is marked as being usable again. Advantageously, a large value of the pre-determined number may be selected in order to avoid switching back and forth between "usable" and "unusable" states in the presence of an intermittent fault.

Although the FIGURE shows each client SCP0, SCP1 connected to a single server SDP, a typical communications system according to the present invention would comprise several servers and clients. In such a system clients and servers may not be fully meshed, i.e. any server may not be capable of connecting to every client and vice versa. In a non fully-meshed communications system according to a further embodiment of the present invention, various clients and servers will form separate connection groups.

In a communications system according to a preferred embodiment of the present invention, one or more multi-cast groups are set up connecting the clients SCP0, SCP1 to the servers SDP.

The multi-cast groups are arranged such that a multi-cast packet sent from a particular server via a particular physical connection (e.g. 14) to a network (e.g. LAN0) will be received on all interfaces (i.e. via all physical connections 10, 16) of all clients reachable from that network. The servers send control messages in the form of multi-cast packets, (datagrams), so that each server only needs to send one control message which is then routed to all clients in the multi-cast group rather than sending a separate control message and setting up a separate connection to each client. In fact the server does not even need to know what clients are attached when using the multi-cast approach.

Working servers regularly send control messages in the form of multi-cast messages to each of these multi-cast groups. Each multicast-message comprises an Internet Protocol (IP) host address which indicates to the recipient clients the address of a working interface on a working server. If multi-cast control messages from a particular address stop arriving, this indicates to the clients that the server interface associated with that address is unusable. Obviously, if the reason that the control messages have stopped is that the server has failed, then no control messages will be received from any interfaces on that server. Hence all interfaces on that server will be identified as unusable and the client will stop trying to access it.

Advantageously, the period between sending control messages, e.g. multi-cast messages, and consequently the length of the watchdog timeout at the client can be set to less than the effective duration of the time period or the "window" allowed for the server to respond in the arrangement of the prior art. This will result in faster failure detection and fewer packets being sent to failed interfaces or to failed servers. Furthermore, failure of a server or an interface will be detected by a client connected to that server or via that interface even if the server is not in use by that client. If a failed interface or server comes back into service it will quickly become obvious to the clients capable of using that interface or server.

Error detection according to the present invention provides each client with real-time information on all the servers in the network to which it is connected, together with all the interfaces to those servers. This information may be stored in the form of a table. Obviously the present invention will not only detect errors with the server interface but any problem with the route to that interface which results in loss of control messages.

Typically, selection of which server to use by a particular client will be based on availability as identified in the table together with costs associated with various IP addresses i.e. alternative server interfaces.

In a preferred embodiment, every server that the client is able to connect to will be allocated a "cost factor" based on geographical distance or proximity via the network (i.e. whether the server is on the same "local" network as the client or on a different but connected "distant" network). For example, the cost factor associated with a control message could be incremented every time that message traversed a router on its way to the client.

Advantageously, for each missed control message from a server, a client may respond by incrementing the cost factor associated with that server. The cost factors may also be stored in tabular form.

The client will normally use servers associated with a lower cost factor in preference to those servers associated with higher cost factors. It may simply be arranged to only use those servers with the lowest cost factor.

The costs associated with each route can be used to implement load sharing. For example, when a local server is under overload the cost associated with the route or routes to that local server may be increased to equal that of remote servers. This will result in clients starting to use more remote servers and thus reduce the load on the overloaded local server. Once the overload condition has passed, the local server may have its route cost decreased and the remote servers will as a result no longer be used by those clients.

Overload may be detected by the client either by virtue of server status information provided by the servers and contained in the control messages or by the client monitoring the performance of a server: for example monitoring the response time of the server or the time between successive control messages.

The present invention is not limited to applications in intelligent networks but has applications in a large number of networks connecting clients to servers.

In particular the use of multicast packets is not essential to the present invention but merely a convenient form of addressing clients in certain networks. Broadcast packets or single address/destination packets may be substituted for the multi-cast packets described above whilst remaining within the scope of the present invention. Broadcast packets are particularly suitable for smaller networks. Hence the present invention has application to ATM based networks, amongst others.

Advantageously, a client could use the control messages to identify (or discover the presence of) servers to which the client has access.

The use of multicast packets in an IP environment is described in the following Requests for Comment: rfc 1112 "Host Extensions for IP Multicasting"(S Deering, Stanford University, August 1989); rfc 1700 "Assigned Numbers" (J Reynolds, J Postel, ISI, October 1994); and rfc 1812 "Requirements for IP Version 4 Routers" especially section 2.2.6 (F Baker Ed. Cisco Systems, June 1995).

I claim:

1. A communications system, comprising:
 a) a plurality of clients;
 b) a plurality of servers for connection to the clients for providing information to the clients;

c) each server comprising means for sending control messages to the clients at least equal to a set rate;

d) each client comprising means for detecting the control messages, and monitor means for determining a fault condition if the control messages are not received from each of the servers at less than predetermined time intervals; and e) at least one of the clients having access to a plurality of the servers for providing the same information, and comprising costing means for allocating a cost value to each of the plurality of the servers, and server selection means for determining which out of the plurality of the servers to use, based on the cost values, and means for incrementing the cost value associated with a particular server to reflect lengths of the time intervals between successive control messages received from that server.

2. The system of claim 1, in which the messages are multi-cast messages.

3. The system of claim 1, in which the messages are datagrams.

4. The system of claim 1, in which the messages are broadcast.

5. The system of claim 1, in which each server and each client are comprised in an intelligent network (IN).

6. The system of claim 5, in which each server comprises a service data point (SDP) and each client comprises a service control point (SCP).

7. The system of claim 1, in which each client comprises means for recording a status of each server for connection to the respective client.

8. The system of claim 1, in which each control message comprises an address part containing information on a source of the control message.

9. The system of claim 1, in which each client comprises means for determining a source of a received control message.

10. The system of claim 1, in which each server comprises means for sending messages over a plurality of interfaces.

11. The system of claim 1, in which each client comprises means for receiving messages sent via a plurality of interfaces from each server.

12. The system of claim 1, in which the monitor means comprises a set of resettable timers, one for each server, and in which the monitor means also comprises means for resetting the timer associated with a server on receipt of a control message by the client from that server.

13. The system of claim 12, in which the set of resettable timers comprises one for each server interface.

14. The system of claim 1, in which the server selection means is arranged to implement load sharing.

15. The system of claim 1, in which the control messages comprise server status information.

16. The system of claim 1, in which each client comprises an overload handler for detecting an overload condition of at least one of the servers by means of one of status information comprised in the control messages and lengths of the time intervals between successive control messages received from that server.

17. The system of claim 16, in which each client comprises means for identifying the servers based on information comprised in the control messages sent by the identified servers.

18. The system of claim 12, in which the monitor means comprises means for inhibiting the resetting of the timer associated with the server when a fault condition associated with that server has been determined until a predetermined number of the control messages have been received from that server.

19. The system of claim 12, in which the monitor means comprises means for inhibiting the resetting of the timer associated with a route when a fault condition associated with that route has been determined until a predetermined number of the control messages have been received via that route.

* * * * *